Feb. 6, 1962 G. LOWDEN 3,019,887
SECURING BOLT
Filed Nov. 6, 1959
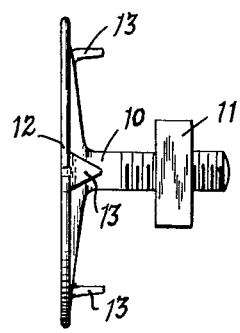
Fig. 1.
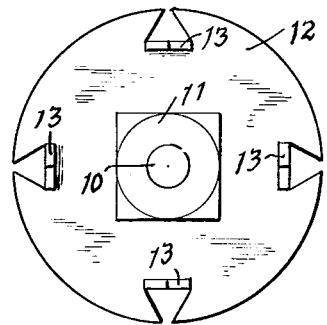
Fig. 2.
Fig. 4.
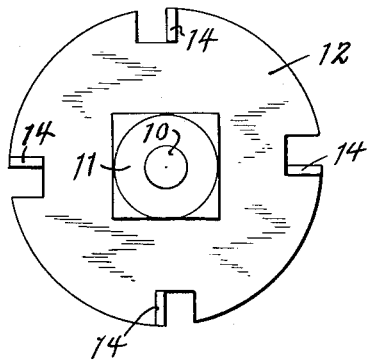
Fig. 3.
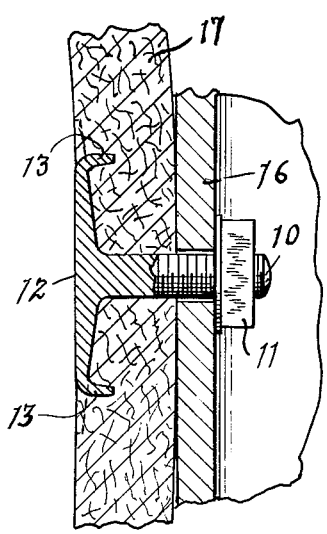
INVENTOR.
GEORGE LOWDEN.
BY
W. H. Atkinson
ATTORNEY

United States Patent Office 3,019,887
Patented Feb. 6, 1962

3,019,887
SECURING BOLT
George Lowden, 45 Danbury Drive, San Francisco, Calif.
Filed Nov. 6, 1959, Ser. No. 851,443
3 Claims. (Cl. 198—151)

My present invention relates to a bolt like securing means and more particularly to a bolt for securing metallic articles upon a flexible non-metallic belt or like support.

The principal object of my invention is to provide a bolt for securing material carrying buckets to a flexible conveyor belt such as is generally formed of woven impregnated fabrics to travel over guiding pulleys and over supporting rollers when conveying materials in a continuous manner from one point to another.

Another object of the invention is to provide a bolt for securing metallic articles to a non-metallic support which will require a minimum of deformation of the non-metallic support and at the same time be held securely against turning when in use.

A further object of the invention is to provide a head for a bolt having a threaded shank which may be employed for securing metallic elements to a non-metallic flexible conveyor belt having a belt engaging area of at least three times the diameter of the securing nut and has barbs struck inwardly at the outer edge thereof.

Other objects and advantages will be in part evident to those skilled in the art and in part pointed out hereinafter in the following description taken in connection with the accompanying drawing wherein there is shown by way of illustration and not of limitation a preferred embodiment of the invention.

In the drawing—

FIG. 1 is a side view showing a preferred form of the invention.

FIG. 2 is an end view of the bolt with nut shown in FIG. 1 of the drawing.

FIG. 3 is a view similar to FIG. 2, showing a modified form of the invention, and FIG. 4 is a fragmentary sectional view showing my improved bolt as employed in securing a material carrying bucket to a non-metallic flexible conveyor belt.

At first glance my improved bolt might appear to be similar to a conventional wagon bolt which usually has a squared shank near the head or is otherwise deformed at this point with radiating ribs that function to prevent a turning of the bolt when the head is applied to a compressible material such as wood or as in the present instance, a fabric or composition belt, mostly of rubber. The bad feature of bolts of the prior art type is that they have a tendency to deform and rupture the belt structure and thus greatly weaken it at the points of attachment. Generally these belt materials are quite elastic and even with elastic deformation of the belt the bolts still have a tendency to turn when a nut is tightened thereupon. To overcome these difficulties I have provided a bolt having a considerably larger head than any of the standard wagon bolts and as a novel feature the head of my bolt is also relatively thin and is feathered out to a thin knife like edge at its outer periphery so that when tightened the outer face thereof will present a surface substantially flush with the surface of the face of the belt. As an additional feature and as a substitute for the squared or fluted shank of the bolt I provide a novel barb or projection at the outer perimeter of the bolt which is formed in a novel, practical and inexpensive manner by simply striking out or upsetting barb forming portions at the periphery thereof.

For a better understanding of the invention reference is now made to FIGS. 1 and 2 of the accompanying drawing wherein I have shown a preferred form of bolt having a threaded shank 10 upon which there is a securing nut 11. At the end of the shank 10 the bolt has a head 12 that is substantially flat on its outer surface and is feathered from the base of the shank 10 so as to provide a substantially knife like edge, from which there is struck a number of circumferentially spaced barbs 13. These barbs, as is more clearly shown in FIG. 2 of the drawing, are of triangular form. With a barb of this particular triangular configuration it will be seen that the outer periphery of the bolt head 12 will be only slightly interrupted at the point where the barbs 13 are formed, and as a result no damage to the belt will result.

In FIG. 3 of the drawing there is shown a modification of the invention wherein barbs 14 of rectangular outline are formed by notching and bending out the material at one side of each notch.

When in use as shown in FIG. 4 of the drawing, the bolt 12 is here shown as employed to secure a material carrying bucket 16 to a conveyor belt 17. In this arrangement the barbs 13 will project into the belt 17 and at the same time the remaining outer periphery of the bolt head 12 will maintain a substantially continuous contact with the inner surface of the belt.

With the head 12 feathered or tapered to the proper thickness, which will be only sufficient to maintain the tension required in the bolt shank 10, it will be found that the head 12 will tend to assume a compensating curved surface that will improve the travel of the belt about a supporting pulley as required in the art for this purpose.

While I have, for the sake of clearness and in order to disclose my invention so that the same can be readily understood, described and illustrated specific forms and arrangements, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. A bolt for mounting metallic articles upon a non-metallic supporting member having a threaded shank for a securing nut, characterized by the fact that the head of said bolt is feathered to its outer edge with a substantially flat outer surface and triangular portions struck inwardly from the outer edge thereof forming barbs on the underside of said head with the apex of the triangular portions at periphery of said head, whereby a substantially continuous contact will be established about the feathered edge of the bolt head for retaining said bolt against turning when a securing nut is tightened upon said threaded shank.

2. A bolt for conveyor belt purposes, comprising a bolt having flat head with a feathered circular edge, said head having inwardly projecting barbs of triangular configuration cut from the feathered circular edge thereof bent inwardly toward the shank of the bolt and forming detents on the underside and remote from the outer edge of said head to prevent a turning of the bolt when in use upon a conveyor belt.

3. A bolt for conveyor belt purposes, comprising a bolt having a threaded shank for a securing nut and flat disc-like head of diminishing thickness from said shank to a feathered edge, and a number of inwardly projecting barbs of triangular configuration extending from the underside of said flat head, said triangular barbs being formed by two diverging cuts made into the feathered edge of said head and locating the apex of said triangular barb and bending said triangular barbs downwardly at the base of the triangular portion defined by said cuts into right angled relation with the underside of said bolt head whereby the base of said triangular barbs will be located remote from the feathered edge of the disc-like head of the bolt.

References Cited in the file of this patent

UNITED STATES PATENTS

| | | |
|---|---|---|
| 248,703 | Caldwell | Oct. 25, 1881 |
| 797,083 | Stowe | Aug. 15, 1905 |
| 1,955,924 | Maclean | Apr. 24, 1934 |

FOREIGN PATENTS

| | | |
|---|---|---|
| 319,182 | Germany | Mar. 5, 1919 |
| 39,717 | Switzerland | Jan. 12, 1907 |